March 8, 1955  J. M. COCHARD  2,703,740

SEGMENT EXTENSION LEAVES FOR ROUND OR OVAL TABLES

Filed Nov. 29, 1952

INVENTOR:
JEAN-MARIE COCHARD
BY:

United States Patent Office 2,703,740
Patented Mar. 8, 1955

2,703,740

SEGMENT EXTENSION LEAVES FOR ROUND OR OVAL TABLES

Jean Marie Cochard, Perthes-en-Gatinais, France

Application November 29, 1952, Serial No. 323,311

Claims priority, application France December 6, 1951

1 Claim. (Cl. 311—66)

The invention relates to round or oval tables fitted with extension leaves.

Hitherto tables with extension leaves known as "à l'italienne" have only found practical application in the case of tables with rectangular tops. This invention enables the practical application of extension leaves to round or oval tables.

According to my invention, the table comprises a top capable of vertical movements and extension leaves that can be positioned side by side around the said top, being connected with one another along radial straight lines, these extension leaves comprising both leaves integral with sliders able to slide towards the outer or inner part of the top and also leaves each of which is articulated on one of the adjacent leaves with sliders, both types of leaves being able to be superimposed the one on the other, due to their being articulated, when the leaves are to be positioned underneath the top of the table.

The sliders can moreover be positioned in grooves formed both in a curved framework of the table and also in the underside of a crown ring attached to the said curved framework.

The leaves articulated on the leaves with sliders may in addition comprise shoulders which can be positioned on the adjoining leaves with sliders on which they are not articulated.

Reference is made to the accompanying drawings forming a part of the specification, it being understood that the said drawings are merely illustrative of a practical embodiment of the invention.

Figure 1:
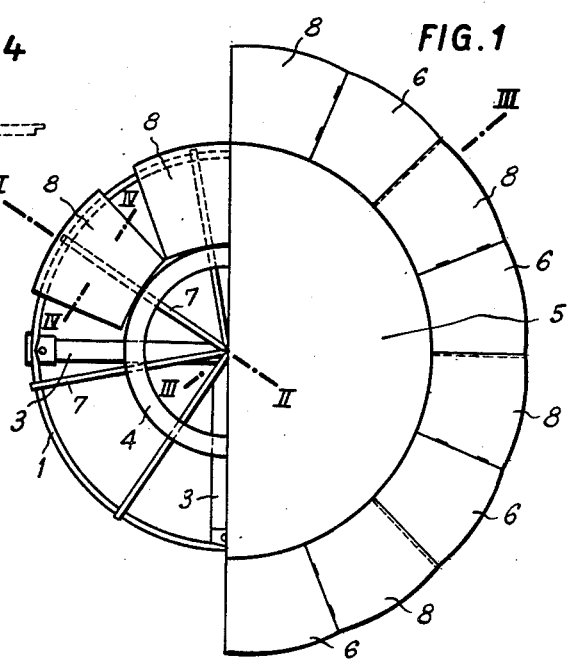

Fig. 1 is a plan of a table according to the invention, shown on one side without the top and with the leaves put away and on the other side with the top on and the leaves pulled out.

Figure 2:
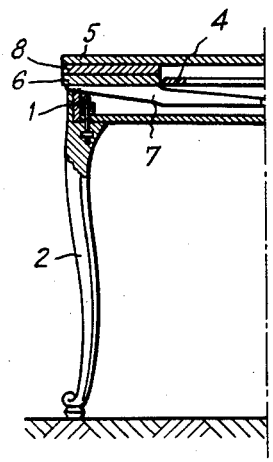
Figure 3:
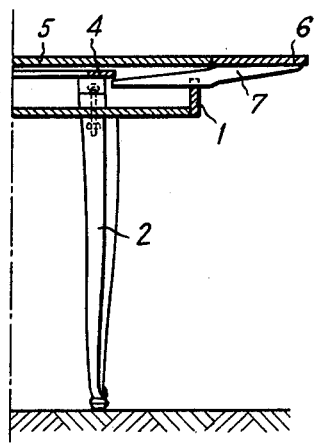
Figure 4:
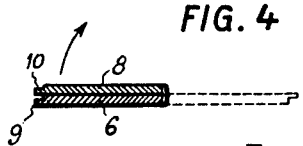
Figure 5:
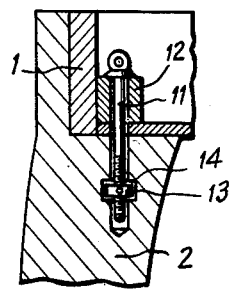

Fig. 2 is a section along the line II—II of Fig. 1.
Fig. 3 is a section along the line III—III of Fig. 1.
Fig. 4 is a section along the line IV—IV of Fig. 1.
Fig. 5 shows the method of attaching a leg to the curved framework of the table.

The table shown on the drawing comprises a curved framework 1 mounted on legs 2. Crosspieces 3 support an inner crown ring 4.

The top 5 of the table is mounted in known manner for movement in vertical direction.

The leaves are divided in two distinct sets. The first set comprises leaves 6 integral with sliders 7, these sliders sliding in grooves formed in the curved framework 1 and positioned underneath the crown-ring 4.

The second set of leaves comprises leaves 8 each articulated on adjacent leaves 6.

The edges of the leaves comprise (Fig. 4) shoulders 9 and 10 enabling a leaf 8 to come to bear on the leaf 6 on which it is not articulated.

The table above described is utilized as follows:

The leaves being folded back under the top 5 (Fig. 2) of the table are drawn outward, which induces raising of the top 5, then, when the leaves are pulled out to a sufficient extent, the top 5 falls back into place behind them; the leaves 8 can then be folded over coming to rest with their shoulders 10 on the adjacent leaves 6 so as to constitute a circular ring around and in extension of the top 5.

The table is thus completely unfolded and the sliders 7 are positioned in the grooves formed in the curved framework 1 and under the crown-ring 4 at the same time.

To put back the leaves under the top 5, all that is required is first to fold back the leaves 8 on the leaves 6, thereafter to raise the top 5 and then to insert all the leaves under it.

Finally, the legs 2 may be attached to the curved framework 1 by screws 11 positioned on a block 12 integral with the curved framework 1 and engaging in a nut 13 lodged in a space 14 formed in each leg 2 and of sufficient dimensions to accommodate the nut 13 without however permitting it to rotate.

Various changes may be made in the details described with reference to the drawings without unduly widening the scope of the invention as described in the accompanying claim.

What is claimed as new and desired to be secured by Letters Patent is:

A round or oval table with extension leaves comprising a top capable of vertical movements and extension leaves that can be positioned side by side around the said top, being connected with one another along radial straight lines, these extension leaves comprising both leaves integral with sliders able to slide towards the outer or inner part of the top and coming to bear both on grooves contrived in a curved frame work of the table and also under a crown ring attached to the said curved framework, and leaves each of which is articulated on one of the adjacent leaves with sliders, both types of leaves being able to be superposed the one on the other, due to their being articulated, when the said leaves are put away under the top of the table.

References Cited in the file of this patent

UNITED STATES PATENTS

| Number | Name | Date |
|---|---|---|
| 351,101 | Fauber | Oct. 19, 1886 |
| 829,439 | De Simone | Aug. 28, 1906 |
| 993,539 | Munz | May 30, 1911 |
| 1,079,099 | Booker | Nov. 18, 1913 |
| 1,384,925 | Seiler | July 19, 1921 |
| 1,875,295 | Fox | Aug. 30, 1932 |
| 2,522,202 | Theis | Sept. 12, 1950 |